Patented Nov. 14, 1950

2,529,856

UNITED STATES PATENT OFFICE 2,529,856

PROCESSES OF PREPARING WATER-SOLUBLE MELAMINE-FORMALDEHYDE RESINS AND PRODUCTS THEREOF

Herbert J. West and William T. Watt, Old Greenwich, Conn., assignors to American Cyanamid Company, New York, N. Y., a corporation of Maine No Drawing. Application December 18, 1944, Serial No. 568,780

13 Claims. (Cl. 260—67.6)

This invention relates to the production of water-soluble methylated methylol melamines.

The alkylation of methylol melamines for the production of organic solvent-soluble resins suitable for lacquers has been described as, for instance, in U. S. Patent No. 2,197,357. However, these products are practically insoluble in water and, therefore, are not suitable for use in aqueous solutions. Water-soluble resins of this type are frequently desired, especially for use in textile processing or the like.

It is one of the objects of the present invention to prepare a methylated methylol melamine which is infinitely miscible with water.

It is a further object to prepare water-soluble methylated methylol melamines in the form of water-white resins which are substantially permanently stable.

These and other objects are attained by reacting methanol with a polymethylol melamine in the presence of an acid and for such length of time as is necessary to obtain a clear solution and for such a length of time as is necessary to obtain reaction of the methyl alcohol with the polymethylol melamine, then said solution is neutralized and preferably made alkaline and concentrated by distillation in high vacuum until the concentration of resin solids is at least 80%. If a solid, dry resin be desired the distillation is continued until a substantially anhydrous, viscous syrup is obtained. This syrup, upon cooling, forms a clear, water-white, resinous solid which is infinitely miscible with water, more particularly at room temperature.

The following examples, in which the proportions are in parts by weight, are given by way of illustration and not in limitation.

Example 1

To 200 parts of methanol are added 100 parts of dry hexamethylol melamine and 0.25 part of crystalline oxalic acid. This mixture is heated under reflux and gently boiled for 15–60 minutes until a clear solution is obtained, whereupon the solution is immediately neutralized to a pH of 7–8 by the addition of dilute caustic soda. The neutralized solution is cooled, clarified by filtration and then concentrated by distillation in vacuum. The distillation may be started at a temperature of 40°–50° C. under moderate vacuum and is continued until a temperature of 90° C. is attained under a vacuum of 27–29" to obtain a substantially anhydrous syrup. The syrup may be poured into suitable pans or the like and allowed to cool to a clear, water-white, solid resin. This resin is permanently stable and is infinitely miscible with water. In the alternative, the syrup may be mixed with a suitable amount of water to give a clear, stable solution suitable for use as such or subject to further dilution, if desired.

Example 2

810 parts of 37% aqueous formaldehyde (10 mols) are adjusted to a pH 7–8 by the addition of caustic soda and 378 parts of melamine (3 mols) are added. The mixture is heated at 70° C. under reflux and as soon as a clear solution is obtained, 1800 parts of methanol are added together with 1.9 parts of oxalic acid. The mixture is now gently boiled for a few minutes and then made slightly alkaline (pH 8.0–8.5). The solution is cooled, clarified by filtration and then concentrated by distillation in vacuum. The distillation may be started at a temperature of 40°–50° C. under moderate vacuum and is continued until a temperature of 90° C. is attained under a vacuum of 27–29" to obtain a substantially anhydrous syrup. The syrup may be treated as in Example 1.

Example 3

About 267 parts of 37% aqueous formaldehyde 3.3) mols are charged into a kettle provided with an agitator and a means for heating. The pH of the aqueous formaldehyde is adjusted to about 8 by means of sodium hydroxide, after which 126 parts of melamine (1 mol) are added. The resulting mixture is heated with agitation until all of the melamine is dissolved, which generally requires a temperature of about 80° C. The resulting syrup is discharged into trays, cooled, and permitted to solidify, which requires about 4–5 hours. The solidified resin thus obtained is broken into lumps and dried at about 50° C. for approximately 10 hours. The hard lumps of resin obtained after drying have a moisture content of about 2–3% and are then ground.

100 parts of the ground melamine-formaldehyde condensation product, prepared in accordance with the above description, are mixed with 200 parts of methanol (95%) in which 0.5 part of crystalline oxalic acid has been dissolved. The resulting mixture is heated in a suitable reaction vessel provided with an agitator and brought to the reflux point and maintained at this point until the melamine-formaldehyde condensation product is all dissolved, which requires about 10–20 minutes. The reaction mixture may be heated for an additional period of time up to a maximum of about 30 minutes. The pH of the resulting syrup is immediately adjusted to about 9-9.5 with a 5 N. solution of sodium hydroxide. The syrup is now filtered under pressure in a filter press, preferably after the addition of a filter aid such as diatomaceous earth. The filtrate is now concentrated under vacuum at a temperature of about 50°-60° C. under a moderate vacuum which is gradually increased until a vacuum of 26-27" of mercury is obtained. The temperature gradually rises to a mixamum of not over about 70°-80° C. When the viscosity reaches about Z—3-Z—6 (Gardner-Holt) the distillation is stoped, at which point the concentration of resin solids is about 85-88%. Sufficient water may now be added to adjust the viscosity to XY to give a product having a concentration of resin solids of about 80% plus or minus 1%. The pH should be about 8.5 plus or minus 0.2 and it may be adpusted to this point by means of sodium hydroxide or formic acid.

In place of the hexamethylol melamine, other polymethylol melamines may be used, either in the dry form or as the aqueous solutions. The methylol melamines may be prepared in any suitable manner by combining 2-6 mols of formaldehyde with 1 mol of melamine. Thus, a crystalline hexamethylol melamine is obtained by heating a neutral aqueous mixture containing 8 mols of formaldehyde and 1 mol of melamine until a clear solution is obtained and, upon allowing the solution to cool, crystalline hexamethylol melamine precipitates out after standing for several days. This method of preparation is not generally commercially feasible because of the low yields of the crystalline product even after 2 or 3 days' standing. Where a polymethylol melamine is desired wherein 4-6 mols of formaldehyde are combined with 1 mol of melamine, it is generally necessary to use an excess of formaldehyde. Thus, with a reaction mixture containing 6 mols of formaldehyde and 1 mol of melamine, a product containing about 5 mols of combined formaldehyde is obtained.

We have found that the polymethylol melamines may be prepared substantially quantitatively by a modified procedure. For the production of hexamethylol melamine, 1 mol of melamine is added to 6.5 mols of formaldehyde (37% aqueous solution) previously adjusted to pH 8.8-9.0. This mixture is heated to 80° C. in 30 minutes and is held at that temperature for about 15 minutes additional. The reaction mixture is poured into trays or the like and, upon cooling, forms a solid mass which is broken into small lumps and this product is dried at 40°-50° C. Upon drying, the hexamethylol melamine is in the form of loose friable lumps showing no tendency to cake and these lumps can be readily ground to a fine powder. The nitrogen content and other analyses indicate that this product is hexamethylol melamine containing 1 mol of water of crystallization. A similar product may be obtained by carrying out the reaction at room temperature, but, in that case, 4-6 hours are required for complete solution of the melamine. Other polymethylol melamines may be prepared in a similar manner.

Generally, some formaldehyde in excess of that required to theoretically produce products having the desired formaldehyde-melamine ratios is employed. Unless excess formaldehyde be used, especially when products containing 4-6 mols of combined formaldehyde are desired, it is difficult to induce all of the formaldehyde to react with the melamine without heating the reacting mixture so long that undesired polymer is formed. Furthermore, some formaldehyde may be lost during the reaction of the melamine and formaldehyde by volatilization. By using an excess of formaldehyde, a product having the desired amount of combined formaldehyde may be readily formed by heating a short time during which a minimum of polymer is formed. Thus, for example, if a substantially monomeric methylol melamine with 4 mols of combined formaldehyde is desired the ratio of formaldehyde and melamine initially used should be about 4½:1. It is important to have a minimum of polymer inasmuch as the monomeric polymethylol melamines dissolve in the methanol and react therewith more rapidly than do the polymers. If the period of reaction of the melamine-formaldehyde condensation products with methanol be much longer than that required for reaction of the monomeric polymethylol melamines the water miscibility of the final product may be impaired.

No aging of the reacted solutions of melamine and formaldehyde is necessary to obtain the corresponding polymethylol melamines since the solutions may be concentrated within 15 minutes after they become clear. If desired, the polymethylol melamine solution may be spray-dried under suitable conditions.

Of course, it will be obvious that the polymethylol melamine need not be dried before reaction of the same with methanol. The melamine and formaldehyde, in any desired proportion, may be reacted to any desired degree and the methanol may be added directly to the reaction solution. This is specifically illustrated in Example 2.

In place of the specific acid and alkali referred to for the production of the methylated product, it will be obvious that other acids and alkalis may be substituted in equivalent amounts. The proportion of acid used for reaction of methanol with melamine-formaldehyde condensation products at a temperature at or near the reflux point is preferably about ¼-2% of acid. If lower temperatures be used, the ratio of acid may be higher. For example, at room temperatures and thereabouts the ratio of acid to the methylol melamine may be 1:1 (molal basis) or even higher.

The amount of methanol used may be varied considerably, although for practical purposes it is commercially uneconomical to use more than is necessary to obtain the desired products. The temperature and degree of vacuum used for the dehydration step in the preparation of the methylated product may also be varied to some extent. However, the time of the initial reaction is of great importance from the standpoint of obtaining water-soluble products and this time should be restricted to that necessary to give a clear solution and to effect the reaction of the methanol with the melamine-formaldehyde condensation product. Exceeding this time to any considerable amount gives a product which has much decreased water-tolerance. The reaction mixture of methylol melamine and methanol may be refluxed only until a clear solution is obtained, neutralized and dehydrated, but in order to obtain a high degree of methylation the refluxing is continued for from about 10 minutes to about 60 minutes, but preferably for about 30 minutes after a clear solution is obtained, after which the solution is neutralized and dehydrated. The time required for the methylation step is prolonged if the reaction be carried out at temperatures under the reflux temperature and this time becomes longer as the temperature is lowered. Commercially it is desirable to effect the reaction quickly and consequently the reaction is preferably carried out under reflux.

The methylated melamine-formaldehyde condensation product is neutralized as soon as the solution is clear and the reaction sufficiently complete and dehydrated under neutral or, and preferably, under alkaline conditions, that is, for example, at a pH of 8–11.

The temperature of the dehydration should be kept as low as possible in order to assure the production of products which are completely miscible with water and which are stable on storage. The temperature should not rise over about 90° C. at the end of the dehydration.

The methylated methylol melamine resins prepared in accordance with the present invention or the solutions of the resins in water are of substantially permanent stability and have been found to be especially valuable in textile processing as, for example, in preventing the shrinkage of wool or in crease-proofing cotton, rayon, etc. To meet the exacting requirements of resins to be used in textile treatment, the product should be stable (show no tendency to hydrophobe) when stored for two weeks at 120° F. Products produced in accordance with our process conform to this stability test.

The solid resins may be used in the plastics industry as flow promoters in urea-formaldehyde and triazine-aldehyde (e. g. melamine-aldehyde) moldings, as well as for the improvement of laminated products. Our resins may also be used for coating or otherwise treating paper and similar fibrous or absorbent materials. The methylated methylol melamine resins of the present invention may be rendered infusible and insoluble by heating them in the presence of suitable acid hardening catalysts. These resins may be mixed with other compatible resins or the like, e. g., water-soluble alkyds, methyl cellulose, etc.

This application is a continuation-in-part of our co-pending application Serial No. 419,040, filed November 13, 1941, now abandoned.

Other suitable changes and variations may be made in carrying out the invention without departing from the spirit and scope thereof as defined in the appended claims.

We claim:

1. The process which comprises refluxing a mixture of methyl alcohol with an acidified polymethylol melamine until a clear solution is obtained, substantially immediately neutralizing the solution by the addition of an alkaline material, and dehydrating the neutralized solution to give a product which in its dry form is a resinous solid at room temperatures and which is substantially infinitely miscible with water at room temperatures, the dehydration being effected under heat and under a vacuum sufficiently high so that the temperature of the heated mass does not substantially exceed 90° C. during dehydration.

2. A process which comprises refluxing an acidified mixture including a polymethylol melamine and methanol until a clear solution is obtained and until the methanol is sufficiently reacted with the methylol melamine, but not longer than about 60 minutes after a clear solution is obtained, then adding sufficient alkali to adjust the pH to 8–11 and dehydrating the resulting alkaline solution under heat and under a vacuum sufficiently high so that the temperature of the heated mass does not substantially exceed 90° C. during dehydration thereby to obtain a product infinitely miscible with water at room temperature.

3. A process which comprises reacting by heating at reflux temperature, a mixture including a polymethylol melamine, methanol and about ¼–2% of free acid until a clear solution is obtained and until the methanol is sufficiently reacted with the methylol melamine but not longer than about 60 minutes after a clear solution is obtained and not long enough to render the resulting product hydrophobic, then adding sufficient alkali to yield a solution having a pH of from 8 to 11, and dehydrating the resulting solution under heat and under a vacuum sufficiently high so that the temperature of the heated mass does not substantially exceed 90° C. during dehydration thereby to obtain a product which is miscible with water in all proportions at room temperatures and stable on storage at 120° F. for two weeks.

4. A methylated methylol melamine which in its dry form is a resinous solid at room temperatures, which is substantially permanently stable, which is stable at a temperature of 120° F. for two weeks, which is substantially miscible with water in all proportions at room temperatures and which is prepared according to the process of claim 1.

5. The process of making a composition comprising a resinous material which is infinitely miscible with water, said process comprising heating under reflux an acidified mixture including methanol and a polymethylol melamine for a period which is at least sufficient to effect reaction between the said ingredients and to form a clear solution but insufficient to render the product hydrophobic, adding an alkaline substance to the solution thereby obtained in an amount sufficient to bring it to a pH within the range of 8 to 11, and dehydrating the resulting solution under heat and under a vacuum sufficiently high so that the temperature of the heated mass does not exceed about 90° C. during dehydration.

6. The process of making a composition comprising a resinous material which is infinitely miscible with water, said process comprising heating under reflux a mixture including methanol and a polymethylol melamine, said mixture being acidified with oxalic acid and said heating under reflux being continued for a period which is at least sufficient to effect reaction between the said methanol and the said polymethylol melamine and to form a clear solution but insufficient to render the product hydrophobic, adding an alkali to the solution thereby obtained in an amount at least sufficient to neutralize it, and dehydrating the resulting solution under heat and under a vacuum sufficiently high so that the temperature of the heated mass does not exceed about 90° C. during dehydration.

7. The process of making a composition including a methylated melamine-formaldehyde condensation product, which composition is stable at a temperature of 120° F. for two weeks and is miscible with water at room temperatures in substantially all proportions, said process comprising heating under reflux an acidified mixture of (1) methanol and (2) a polymethylol melamine, said heating being continued for a period which is at least sufficient to effect reaction between the said ingredients and to form a clear solution but insufficient to render the product hydrophobic, converting the resulting acidic solution to an alkaline solution having a pH within the range of 8 to 11, and dehydrating the alkaline solution to a concentration of at least 80% resin solids, the dehydration being effected under heat and under a vacuum sufficiently high so that the temperature of the heated mass does not exceed about 90° C. during dehydration.

8. In a process of making a composition comprising a resinous material that is miscible with water in all proportions and stable on storage at a temperature of 120° F. for two weeks, which process includes the steps of (1) heating under reflux an acidified mixture of methanol and a polymethylol melamine for a period which is at least sufficient to effect reaction between the said ingredients and to form a clear solution but insufficient to render the product hydrophobic and (2) converting the acidic solution thereby obtained to an alkaline solution having a pH within the range of 8 to 11 by adding to the said acidic solution a hydroxide of an alkali metal in an amount sufficient to provide said pH, the improvement which consists in the step of dehydrating the alkaline solution under heat and under a vacuum sufficiently high so that the temperature of the heated mass does not exceed about 90° C. during dehydration.

9. In a process of making a composition comprising a methylated melamine-formaldehyde reaction product, which composition is miscible with water in all proportions and is stable on storage at a temperature of 120° F. for two weeks and which process includes the step of heating under reflux an acidified mixture of (1) methanol and (2) a polymethylol melamine containing at least 3 mols of combined formaldehyde, the improvement which consists in the steps of (a) converting the acidic solution thereby obtained to an alkaline solution having a pH within the range of 8 to 11 and (b) dehydrating the said alkaline solution to a concentration of at least 80% resin solids, the dehydration being effected under heat and under a vacuum sufficiently high so that the temperature of the heated mass does not exceed about 90° C. during dehydration.

10. The process which comprises heating, at boiling temperature, a mixture which initially comprises methanol and dry hexamethylol melamine, said mixture being acidified with oxalic acid and said heating being continued for a period not longer than 60 minutes until a clear solution has been obtained but not sufficiently long to render the product hydrophobic; immediately thereafter bringing the acidified solution to a pH of 7 to 8 by the addition of a dilute solution of a hydroxide of an alkali metal; filtering the resulting solution; and concentrating the filtered solution under heat and under a vacuum sufficiently high so that the temperature of the heated mass does not exceed about 90° C. during said concentration.

11. The process which comprises adding 100 parts by weight of dry hexamethylol melamine and 0.25 part by weight of crystalline oxalic acid to 200 parts by weight of methanol; heating the resulting mixture under reflux and gently boiling the same for from 15 to 60 minutes until a clear solution is obtained; bringing the acidified solution to a pH of 7 to 8 by the addition of a dilute solution of sodium hydroxide; cooling the resulting solution; filtering the cooled solution; and concentrating the filtered solution under heat and under a vacuum sufficiently high so that the temperature of the heated mass does not exceed about 90° C. during said concentration.

12. The process which comprises heating a mixture of aqueous formaldehyde and melamine under reflux until a clear solution has been obtained, said aqueous formaldehyde initially having been adjusted to a pH of from 7 to 8 and being employed in a molar ratio of 10 mols of formaldehyde to 3 mols of said melamine, and said heating under reflux of the said reactants resulting in the formation of an aqueous solution of a polymethyl melamine; adding to the solution thereby obtained methanol and oxalic acid in an amount sufficient to acidify the resulting solution; boiling the acidified solution for a period not longer than 60 minutes and not sufficiently long to render the product hydrophobic; bringing the resulting solution to a pH of from 8 to 8.5; filtering the resulting solution; and concentrating the filtered solution under heat and under a vacuum sufficiently high so that the temperature of the heated mass does not exceed about 90° C. during said concentration.

13. The process which comprises adding 378 parts by weight of melamine to 810 parts by weight of 37% aqueous formaldehyde solution which previously has been adjusted to a pH of from 7 to 8; heating the resulting mixture at 70° C. until a clear solution has been produced, whereby an aqueous solution of a polymethylol melamine is formed; adding to the resulting solution 1800 parts by weight of methanol and 1.9 parts by weight of oxalic acid; gently boiling the acidified solution for a few minutes and then making it alkaline to a pH of from 8 to 8.5; cooling the alkaline solution; filtering the cooled solution; and concentrating the filtered solution under heat and under a vacuum sufficiently high so that the temperature of the heated mass does not exceed about 90° C. during said concentration.

HERBERT J. WEST.
WILLIAM T. WATT.

REFERENCES CITED

The following references are of record in the file of this patent:

UNITED STATES PATENTS

| Number | Name | Date |
| --- | --- | --- |
| 2,197,357 | Widmer | Apr. 16, 1940 |
| 2,223,327 | Light | Nov. 26, 1940 |
| 2,454,078 | McGrew | Nov. 16, 1948 |
| 2,454,495 | Widmer et al. | Nov. 23, 1948 |

FOREIGN PATENTS

| Number | Country | Date |
| --- | --- | --- |
| 206,608 | Switzerland | Dec. 1, 1939 |
| 867,109 | France | June 30, 1941 |

OTHER REFERENCES

Gams British Plastics, pp. 508–520, Feb. 1943.

Certificate of Correction

Patent No. 2,529,856                          November 14, 1950

HERBERT J. WEST ET AL.

It is hereby certified that error appears in the printed specification of the above numbered patent requiring correction as follows:

Column 3, line 9, for "mixamum" read *maximum*; line 12, for "stoped" read *stopped*; line 18, for "adpusted" read *adjusted*; column 6, lines 4 and 5, after "heating" insert a comma; column 8, line 17, for "polymethyl" read *polymethylol*;

and that the said Letters Patent should be read as corrected above, so that the same may conform to the record of the case in the Patent Office.

Signed and sealed this 20th day of February, A. D. 1951.

[SEAL]

THOMAS F. MURPHY,
*Assistant Commissioner of Patents.*